Figure 6:
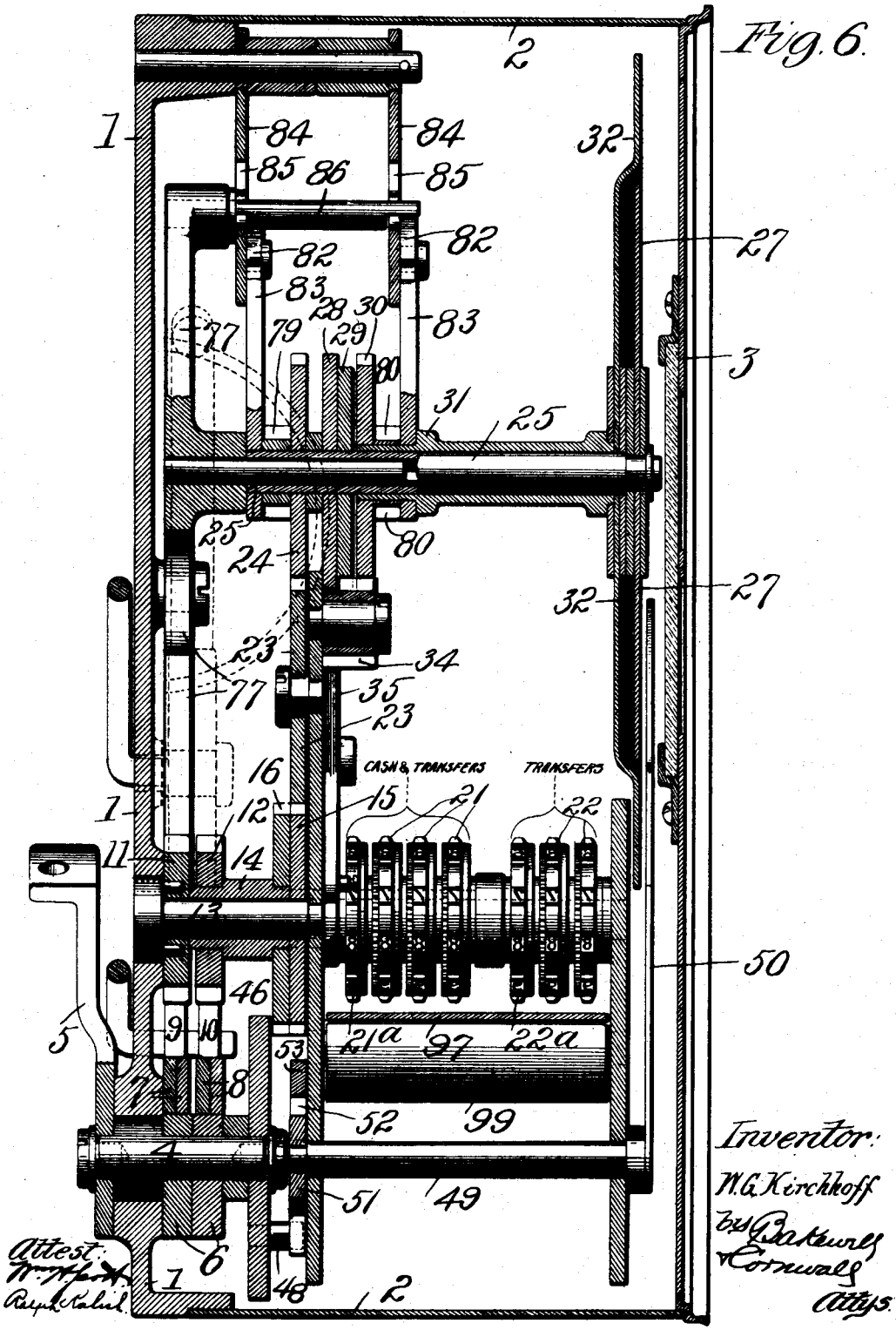

No. 683,471. Patented Oct. 1, 1901.
W. G. KIRCHHOFF.
FARE REGISTER.
(Application filed July 7, 1900.)
(No Model.) 10 Sheets—Sheet 1.
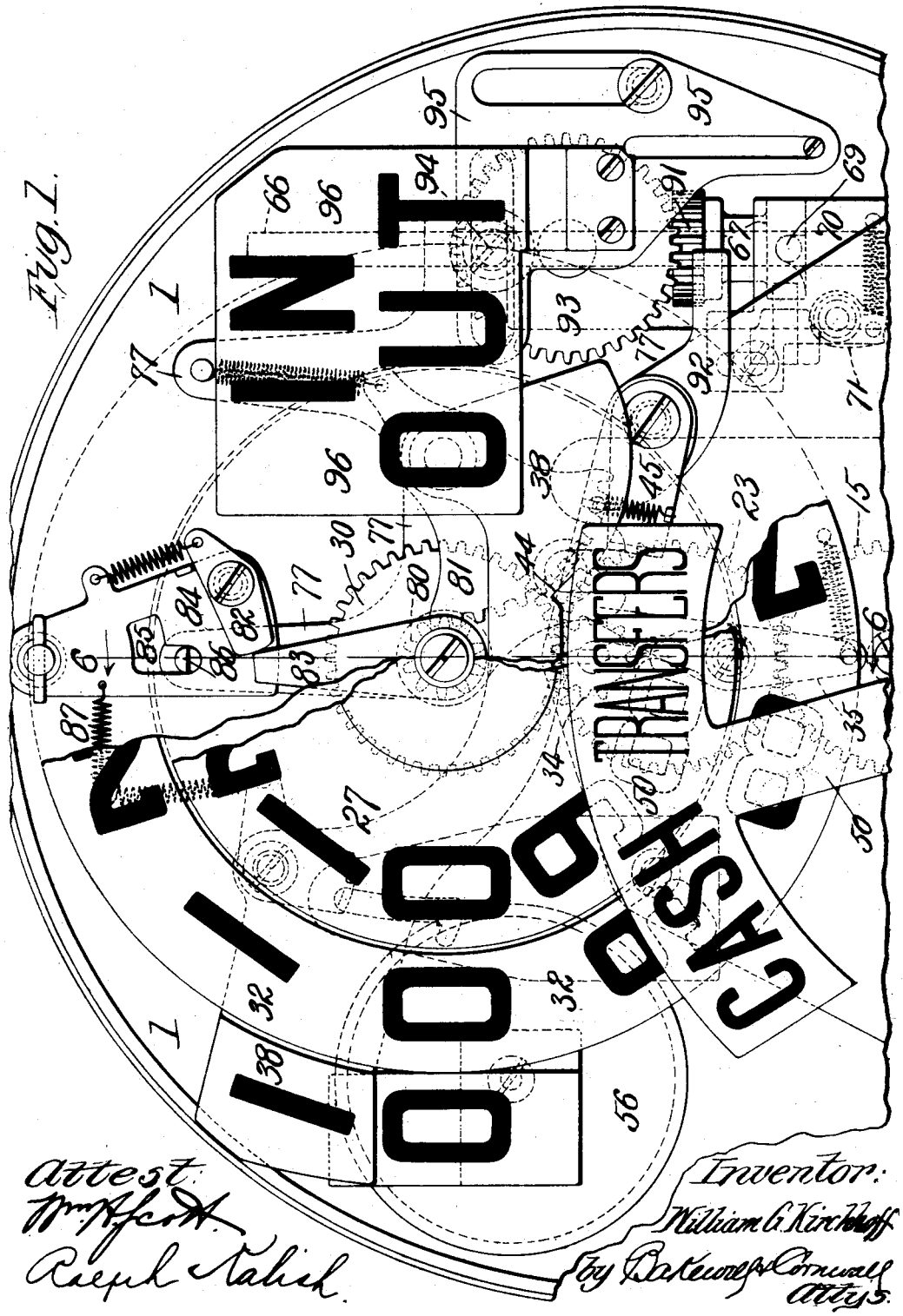

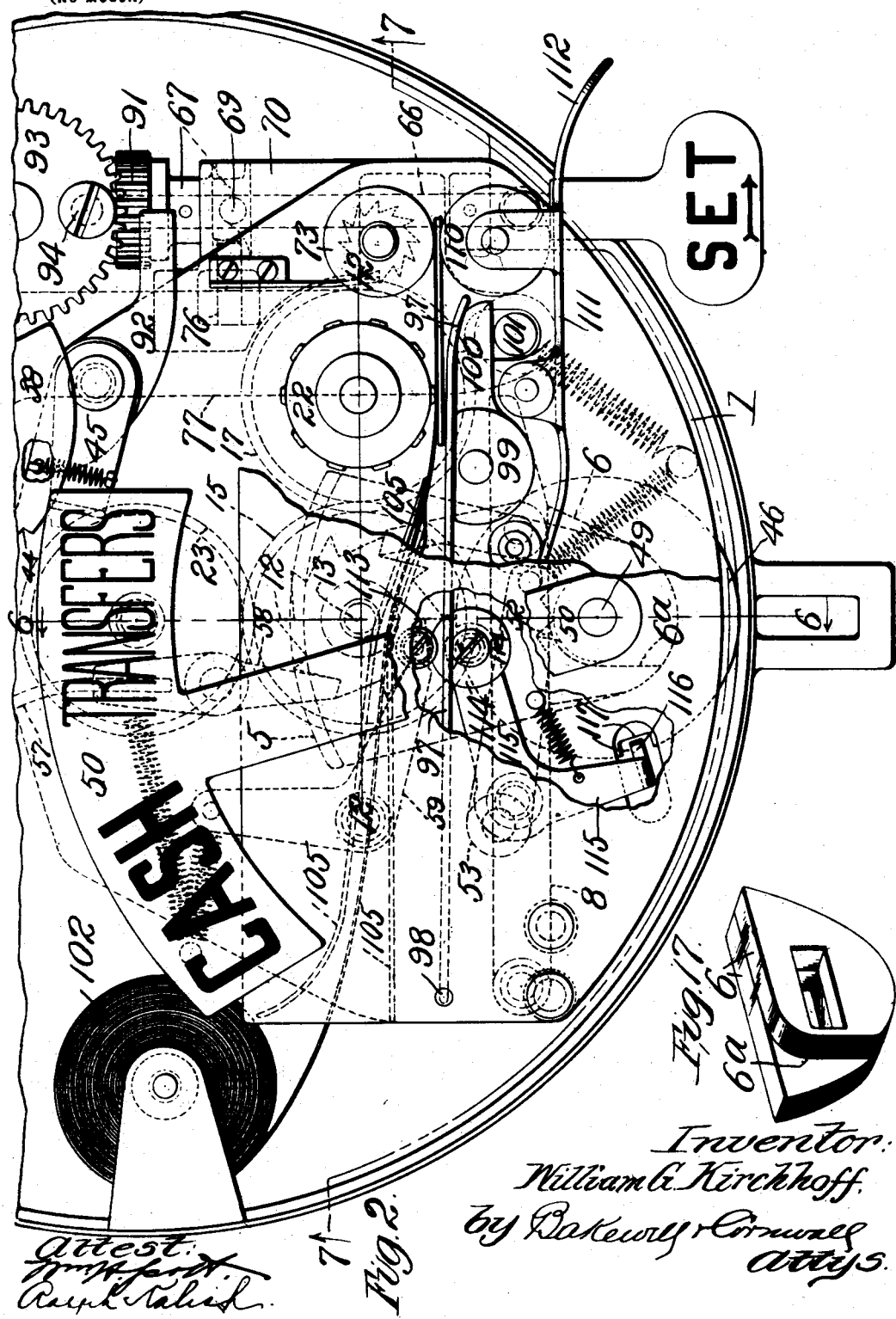

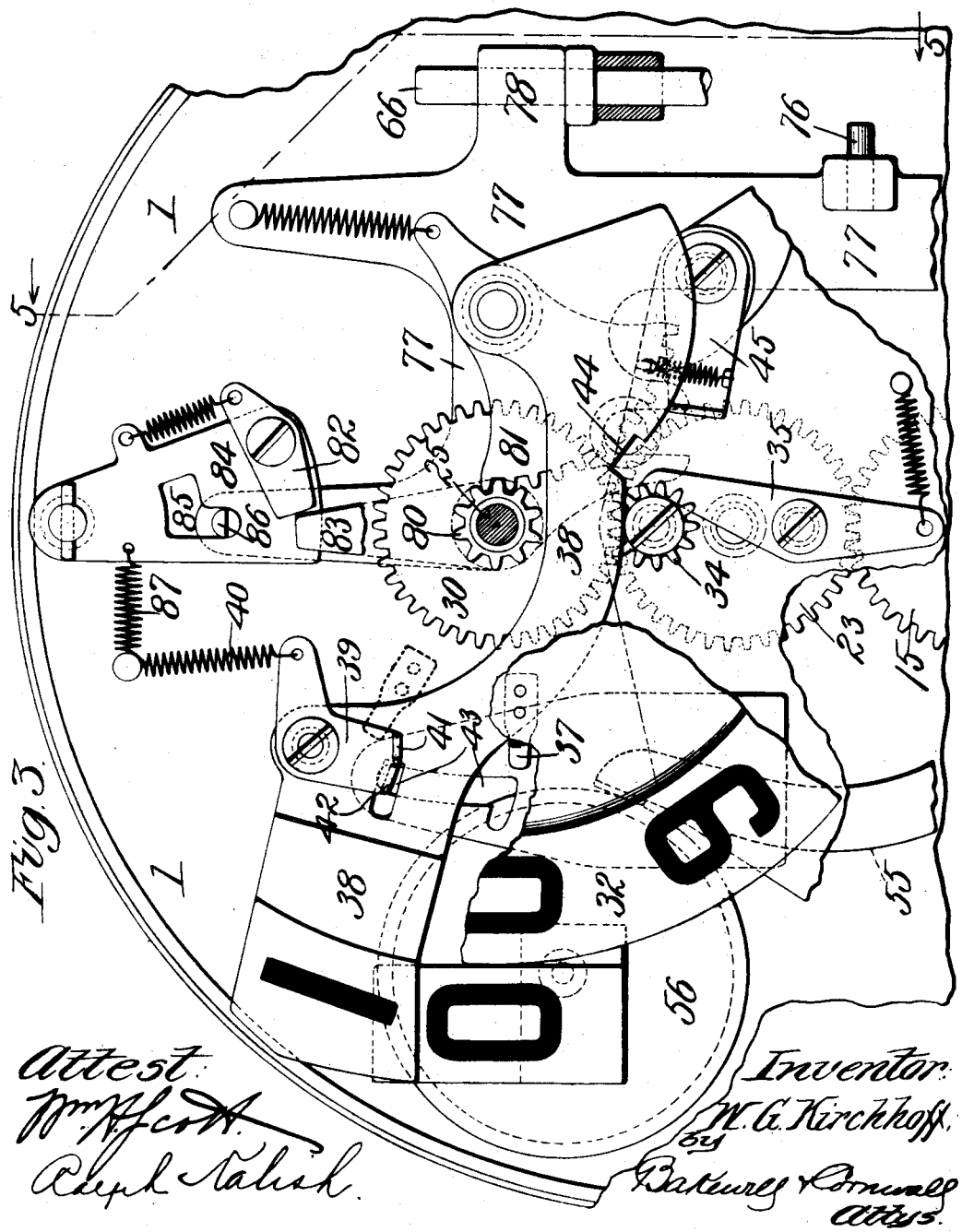

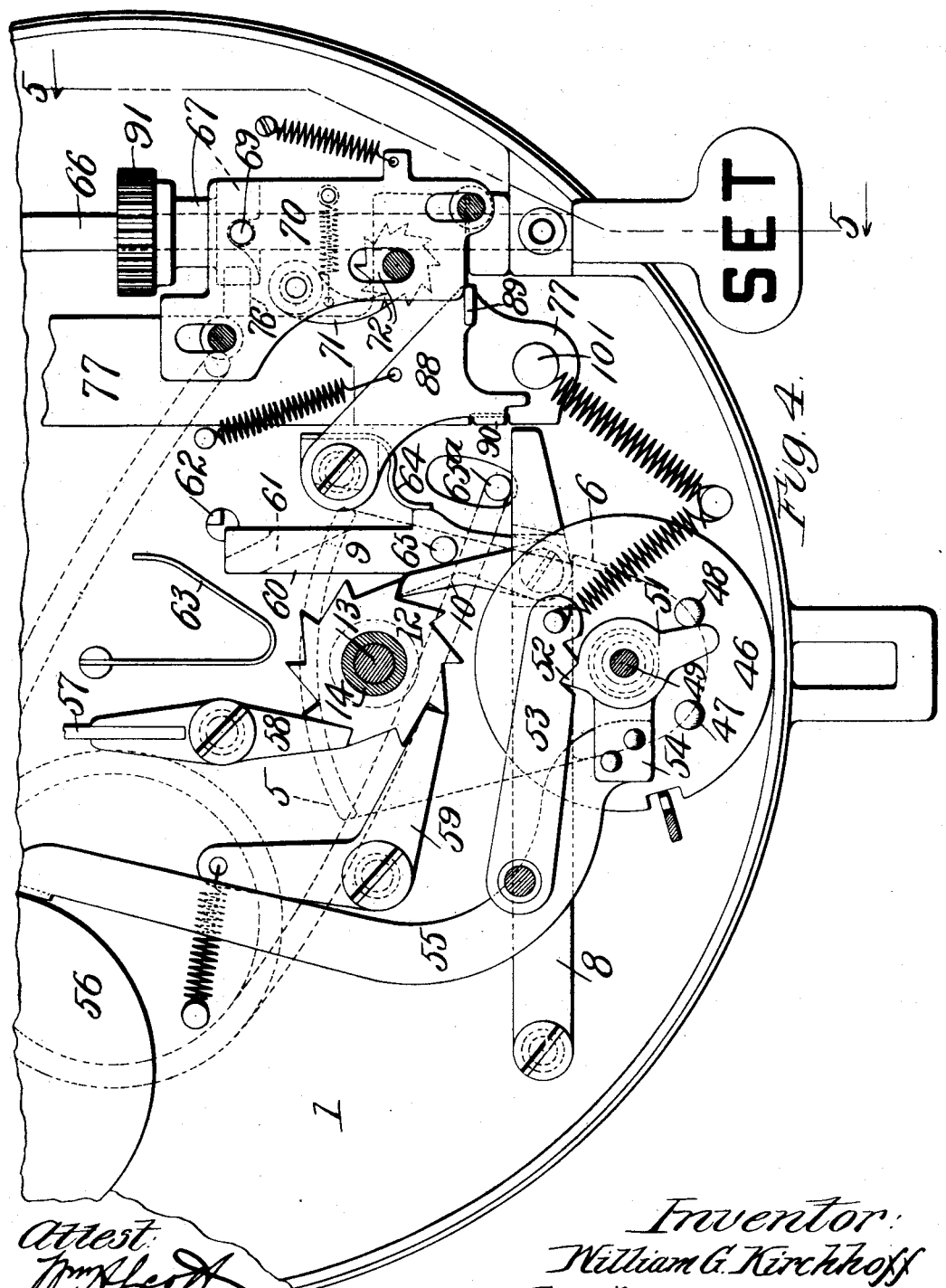

No. 683,471. Patented Oct. 1, 1901.
W. G. KIRCHHOFF.
FARE REGISTER.
(Application filed July 7, 1900.)
(No Model.) 10 Sheets—Sheet 5.
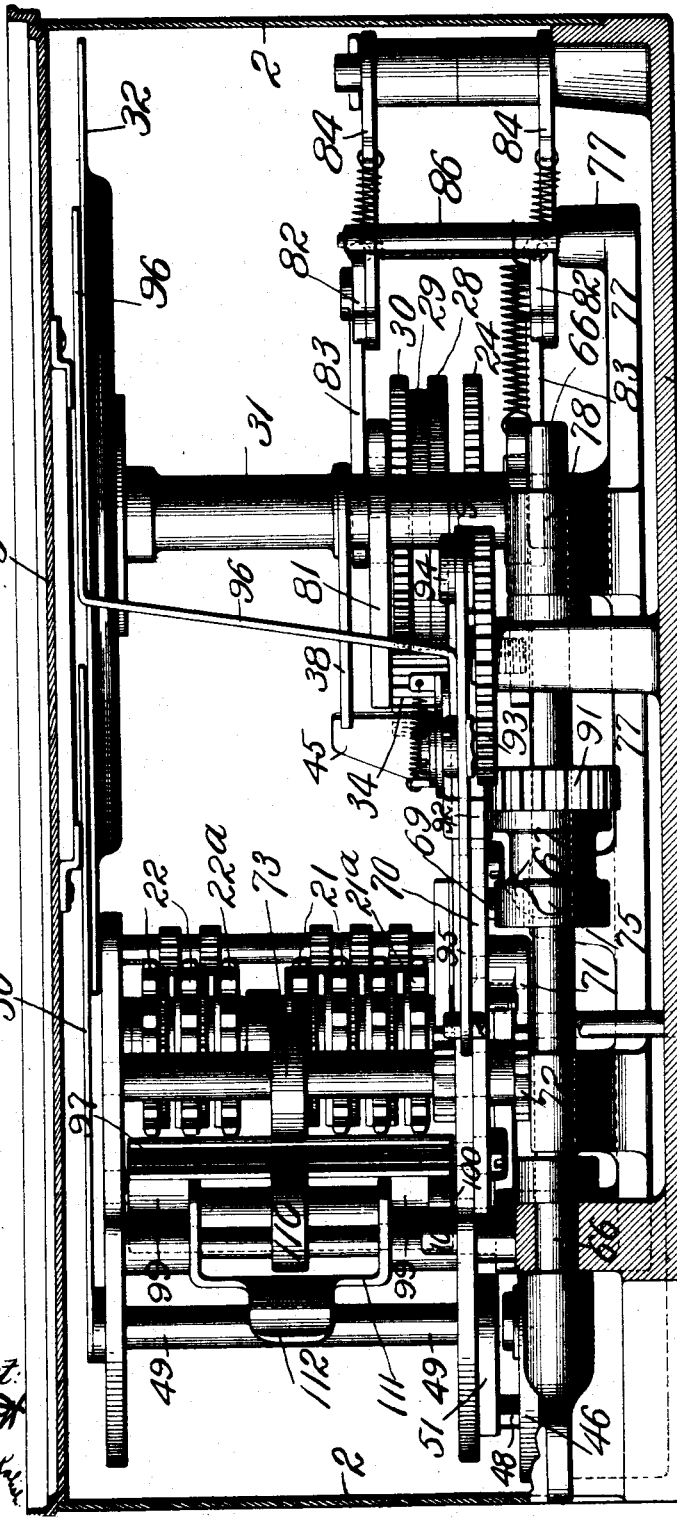
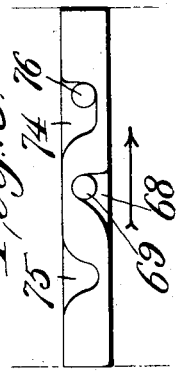

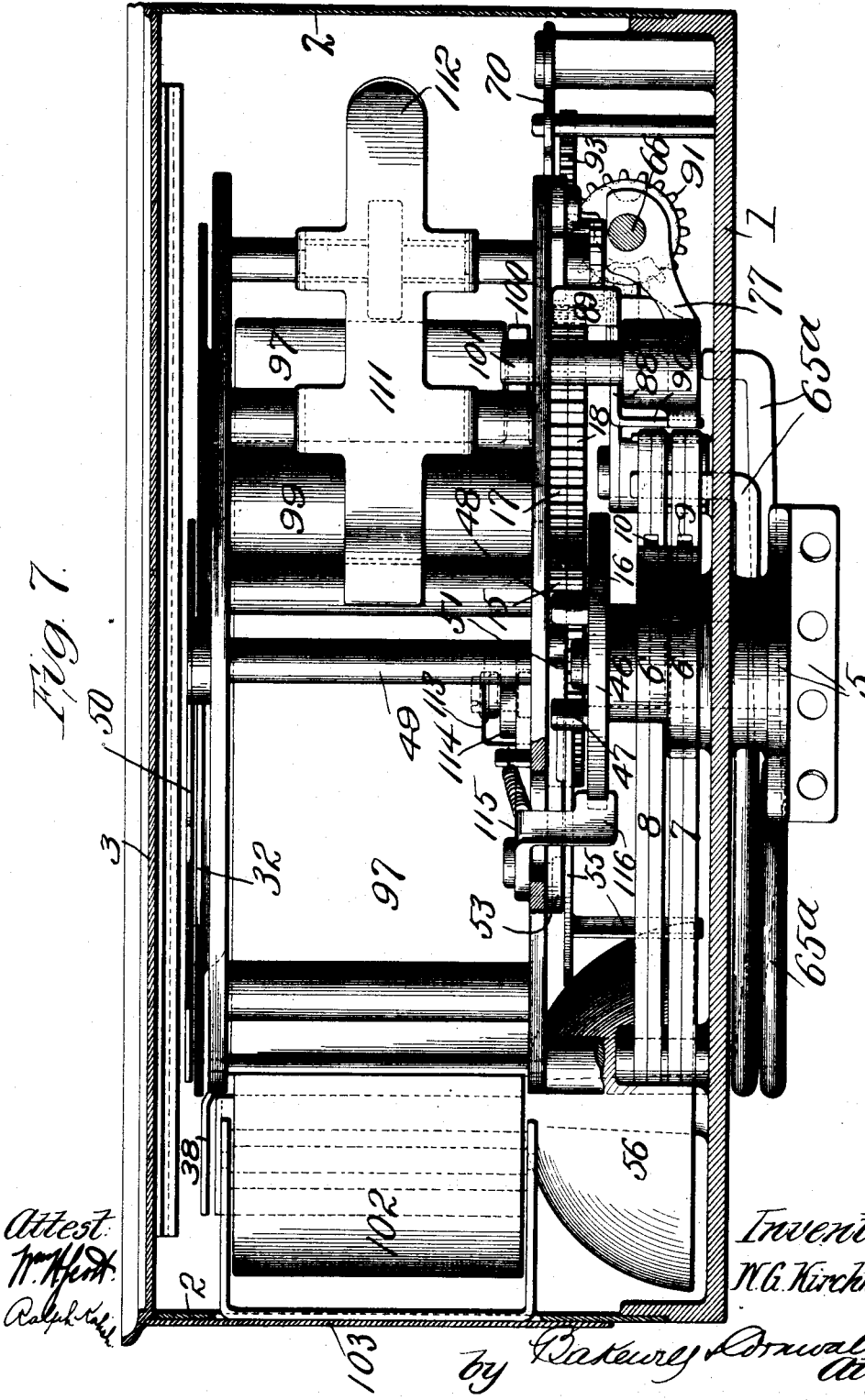

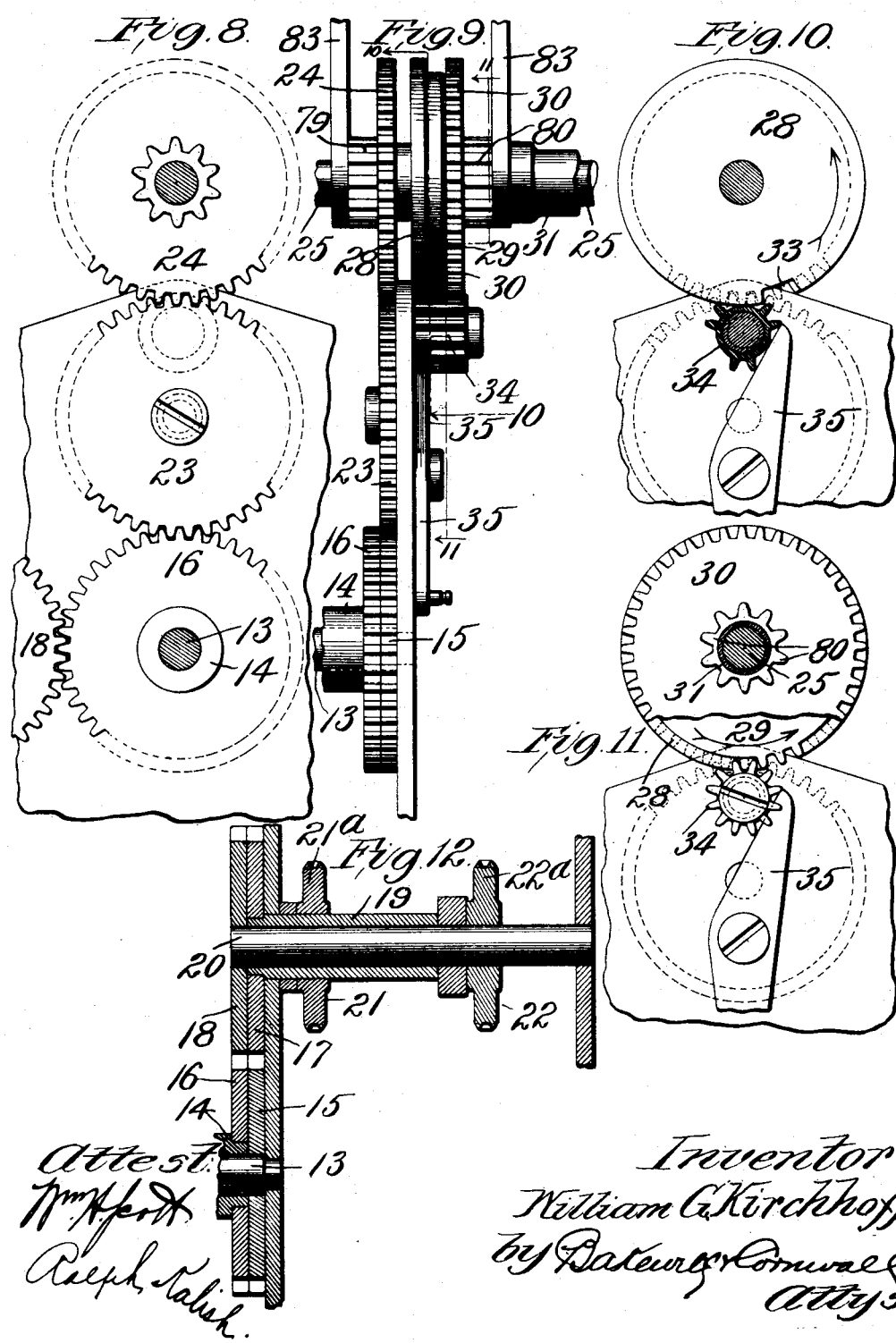

No. 683,471. Patented Oct. 1, 1901.
W. G. KIRCHHOFF.
FARE REGISTER.
(Application filed July 7, 1900.)
(No Model.) 10 Sheets—Sheet 9.
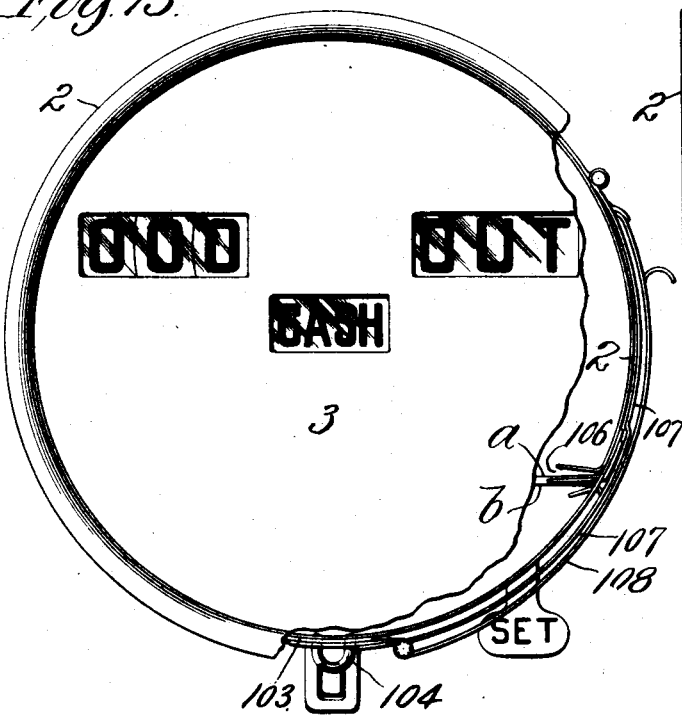
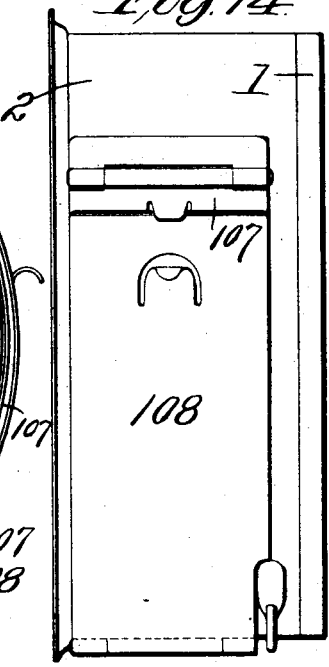
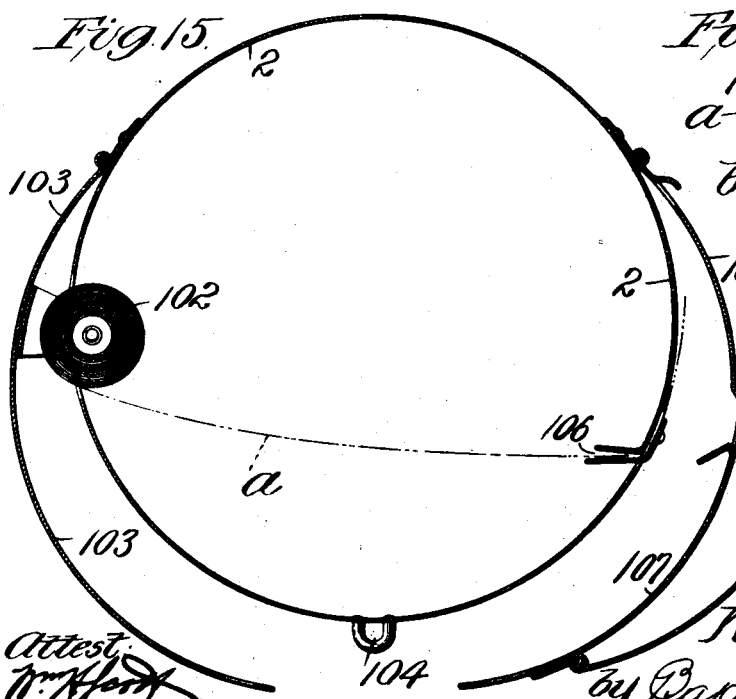
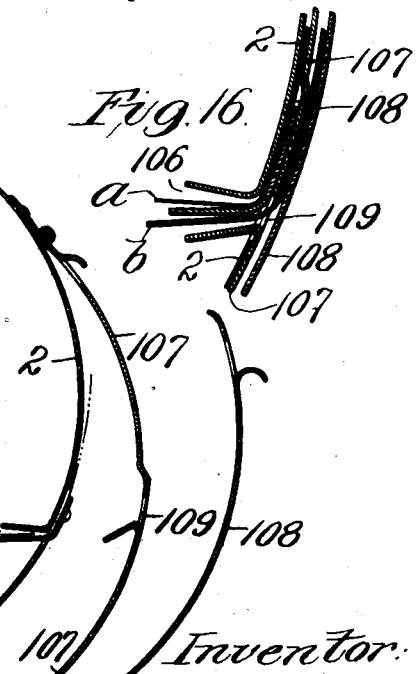
Inventor:
W. G. Kirchhoff,
by Bakewell & Cornwall
Attys
Attest:

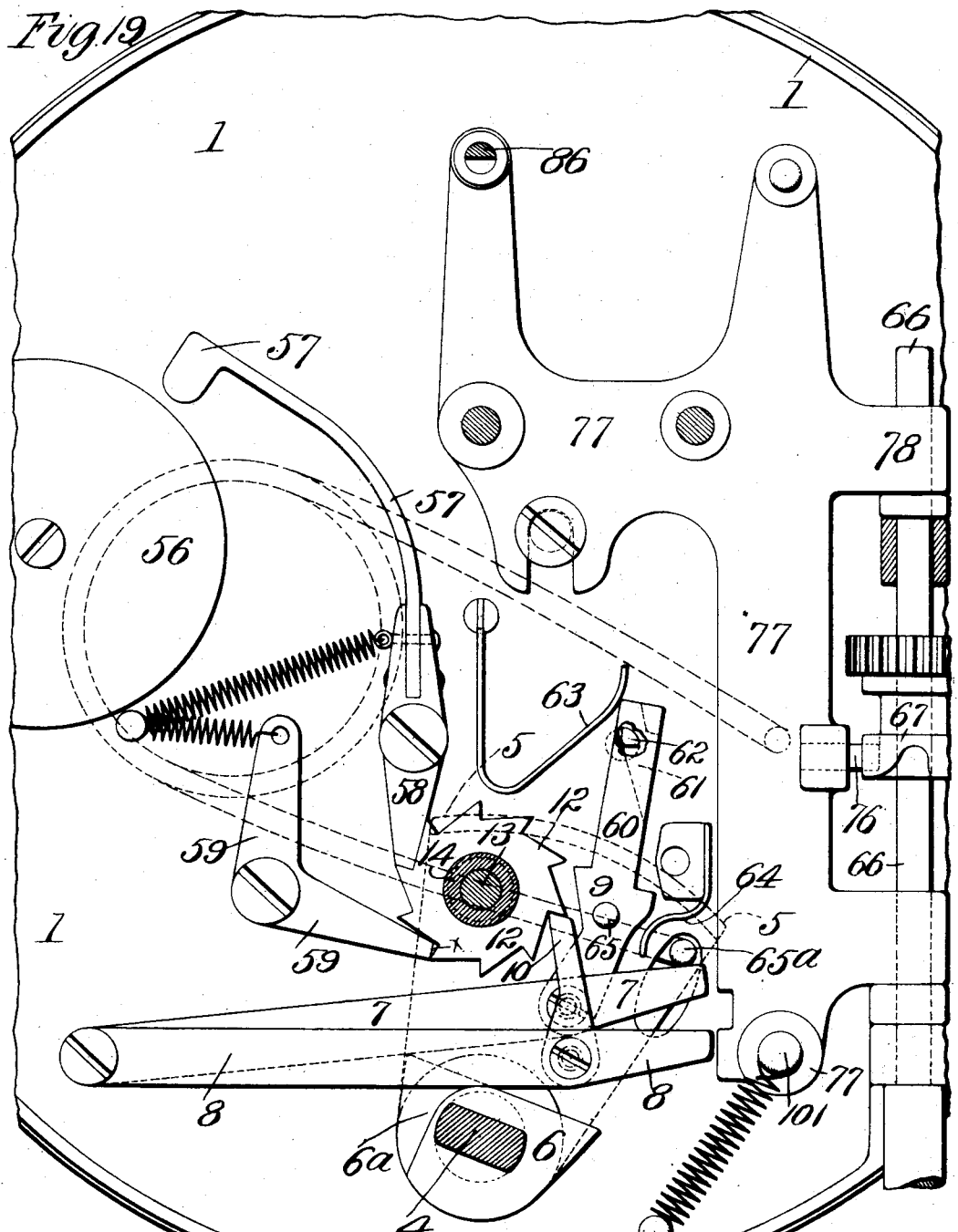

UNITED STATES PATENT OFFICE.

WILLIAM G. KIRCHHOFF, OF ST. LOUIS, MISSOURI, ASSIGNOR TO JAMES W. ALLISON, TRUSTEE, OF SAME PLACE.

FARE-REGISTER.

SPECIFICATION forming part of Letters Patent No. 683,471, dated October 1, 1901.

Application filed July 7, 1900. Serial No. 22,805. (No model.)

*To all whom it may concern:*

Be it known that I, WILLIAM G. KIRCHHOFF, a citizen of the United States, residing at St. Louis, Missouri, have invented a certain new and useful Improvement in Fare-Registers, of which the following is a full, clear, and exact description, such as will enable others skilled in the art to which it appertains to make and use the same, reference being had to the accompanying drawings, forming part of this specification, in which—

Figure 1 is an elevational view of the upper portion of my improved fare-register, certain of the parts being broken away to more clearly show the interior. Fig. 2 is a similar view showing the lower portion of the register. Fig. 3 is a view corresponding to Fig. 1, certain of the parts being omitted to show the interior mechanism. Fig. 4 is a view corresponding to Fig. 2, certain of the parts being omitted to show the interior mechanism. Fig. 5 is an edge elevational view on lines 5 5, Figs. 3 and 4. Fig. 6 is a vertical sectional view looking from the opposite side of the machine shown in Fig. 5, said view being taken on lines 6 6, Figs. 1 and 2. Fig. 7 is a horizontal sectional view on line 7 7, Fig. 2, looking in the direction of the arrow. Fig. 8 is a detail view showing the transmitting-gears in front elevation. Fig. 9 is a detail view of the transmitting-gears, showing the same in side elevation. Fig. 10 is a sectional view on line 10 10, Fig. 9. Fig. 11 is a sectional view on line 11 11, Fig. 9. Fig. 12 is a sectional view on line 12 12, Fig. 2. Fig. 13 is a front elevational view of the register as an entirety, part of the front plate being removed to more clearly show the manner of housing and guiding the strips of paper upon which the number of fares registered in the machine are printed. Fig. 14 is a side elevational view of the register-casing. Fig. 15 is a detail view of the casing, showing the strip guides and housing in an open position. Fig. 16 is an enlarged sectional view showing the paper housing and guide closed and the paper in position therein. Fig. 17 (see Sheet 2) is a detail view of the rocker-block. Fig. 18 (see Sheet 5) is a development of the operating-cam on the resetting-shaft, and Fig. 19 is a vertical sectional view taken some little distance away from the base of the machine to more clearly show certain parts in elevation.

This invention relates to a new and useful improvement in fare-registers especially designed for use in street-cars, the object being to register different classes of fares, such as cash and transfers, the register being capable of such manipulation that in the registration of different classes of fares separate totalizers are operated, so that at the end of each trip will be shown the number of fares registered in each class.

Another object of my invention is to print the number of fares received as exhibited by the totalizers, one web or strip of paper, known as the "company's strip," being retained in the machine, inaccessible to the conductor, while the other web or strip of paper, known as the "conductor's strip," may be inserted and removed at will.

Another object of my invention is to provide certain locks for the several parts employed, so that when said parts are in certain positions the machine is rendered inoperative. This prevents persons from operating the machine in other than the proper way, and consequently the mechanism when returned or set back to zero is in the proper position to perform its required functions.

As two classes of fares are to be registered in the machine, it is desirable that different audible signals be sounded to indicate, first, that a fare has been registered, and, second, by the tone of the signal the kind of fare registered. This is accomplished by the use of a single bell, with which coöperates a muffler, whereby the bell is muffled when the parts are in one position, so that when struck by the hammer it will emit a sound different from that produced when the bell is struck by the hammer in the absence of the muffler. There are also provided the trip-indicators bearing the words "In" or "Out" or "East" or "West," as is usual, in addition to which there is the usual fare-indicator bearing the words "Cash," "Transfers," or other words of like import.

With these objects in view the invention consists in the novel construction, arrangement, and combination of the several parts, all as will hereinafter be described and afterward pointed out in the claims.

In the drawings, 1 indicates the back plate of the machine, which is preferably provided with a marginal flange for receiving the sheet-metal casing 2. This casing carries the face-plate 3, which, as shown in Fig. 13, is provided with suitable sight-openings to indicate the number of fares registered on a trip, the class of fares registered, and the kind of trip—that is, "In" or "Out," "East" or "West," &c. Base-plate 1 is provided with suitable projections in the form of bosses, &c., in or upon which are mounted the several parts constituting the mechanism of my improved register.

4 indicates the main or operating shaft, which carries a rock-arm 5 on its rear end, said rock-arm being in the form of a segment with a marginal flange provided with suitable openings, through which may be threaded the operating-cords of the machine. This rock-arm is designed to be moved in opposite directions to register different classes of fares, movement of the rock-arm to the right registering a transfer and cash, and movement of said arm to the left registering cash only. The inner or forward end of the main shaft carries a rocking block 6. (Shown more clearly in Fig. 17.) For cheapness in manufacture this rocking block 6 is preferably made up of two pieces; but it is obvious that the same can be cast in one piece.

7 and 8 indicate two pawl-carrying arms which are held by a suitable spring against the upper flat face of the rocking block 6. These pawl-carrying arms have pawls 9 and 10 mounted upon their ends, respectively, said pawls coöperating with ratchets 11 and 12, the former of which is fixed upon a shaft 13, while the latter is mounted upon a sleeve arranged on said shaft. This shaft and sleeve have secured to their forward ends spur-gears 15 and 16, respectively, (see Figs. 6 and 12,) said gears meshing with gears 17 and 18, mounted upon a sleeve 19 and a shaft 20, as shown in Fig. 12.

21 indicates the wheels of the adding mechanism, one of which, 21$^a$, is fixed to the sleeve 19, while the others are loosely arranged upon said sleeve, whereby when a step-by-step movement is imparted to the wheel 21$^a$ one complete revolution thereof will actuate the next adding-wheel of higher order one-tenth of a revolution, and so on throughout the whole series of wheels, a complete revolution of one adding-wheel actuating the next adding-wheel of higher order one-tenth of a revolution. This is accomplished by any well-known transferring mechanism, and as the same is so well understood it is not deemed necessary to go into a detailed description thereof here. The wheels 21 and 21$^a$ constitute one bank and record both cash and transfers without making a distinction between them. This bank of adding-wheels is actuated through the train of mechanism comprising the rocking block 6, pawl-carrier 7, ratchet 11, shaft 13, and gears 15 and 17, the latter of which is secured to the sleeve 19, upon which the adding-wheels are mounted, the whole being set in motion when the crank-arm 4 is pulled to the right. As seen in Figs. 17 and 19, the rocking block 6 is cut away at 6$^a$, so that when the operating-lever is pulled to the right only one pawl-carrying arm 7 will be actuated, the pawl-carrying arm 8 remaining idle. However, when the operating-lever is pulled to the left the rocking block 6 in addition to actuating the pawl-carrying arm 7 will lift the arm 8 and drive the ratchet 12, mounted on the sleeve 14, and through the spurs 16 and 18 drive the shaft 20, upon which is mounted another bank of adding-wheels 22, one of them, 22$^a$, being secured to the shaft 20 and the others loosely mounted on said shaft, the adding-wheel 22$^a$ serving as a driver for the bank when a step-by-step motion is imparted thereto, as is well understood.

It will be seen from the above and from an inspection of Figs. 6, 12, and 19 that whenever the actuating-lever is pulled to the right the bank composed of the adding-wheels 21 will be operated, the bank being composed of the adding-wheels 22 remaining stationary, and that when the operating-lever is pulled to the left both banks will be operated. In this manner the bank composed of the wheels 22 will register a selected class of fares, in this instance transfers, separate and distinct from another class, while the bank composed of the wheels 21 will not only register the class of transfers registered in the first-mentioned bank, but another class, in this instance cash, so that the register composed of the wheels 21 may be termed a "totalizer," including, as it does, all the fares registered in the machine, while the register composed of the wheels 22 may be termed a register for a "selected" class of fares.

Meshing with one of the train of gearing which drives the general register or totalizer, in this instance meshing with the gear 15, is a gear 23, with which engages in the normal operation of the machine a gear 24, mounted upon a sleeve 25, upon the opposite or outer end of which is a disk 27, carrying on its face numbers from "1" to "9" and the zero-mark. It will thus be seen that any number of fares registered in the general totalizer on a trip will be exhibited through the face-plate of the machine through the medium of the numbers on this disk 27. As disk 27 will only indicate the registration of fares less than ten in number, it is necessary to provide means for indicating any number of fares greater than ten, the machine shown in the present drawings indicating through the instrumentality of one mechanism the number of fares up to ninety-nine, and through the instrumentality of another mechanism any number of fares up to one hundred and ninety-nine, this last number of fares indicated being the capacity of the present machine.

I will now describe the manner in which a number of fares greater than ten may be indicated or exhibited through the face-plate.

Referring to Figs. 6 and 8 to 11, inclusive, it will be seen that the sleeve 25, which carries the disk 27, rotates freely upon a fixed stud-shaft, and conjoined to this sleeve are two disks 28 and 29, while in juxtaposition thereto is a spur-gear 30, this latter being mounted upon a sleeve 31, carrying on its outer end a dished disk 32, in whose recessed face is received the disk 27. This disk 32 is provided with numerals on its face from "1" to "9" and also the zero-mark, which are designed to register with the sight-opening in the face-plate opposite the numbers on the disk 27 and by different combinations exhibit numbers from "10" to "99." Disk 28, before referred to, (see Fig. 10,) is formed with a recess or notch 33 in its periphery to coöperate with the teeth of a mutilated gear 34, permitting said gear to be rotated only when the teeth thereof are received in the notch. As this disk 28 rotates with the sleeve 25, it follows that it will only permit the movement of the mutilated gear at one point in its revolution. When the notch 33 is opposite the mutilated gear, teeth, preferably three in number, which project from the periphery of disk 29, (see Fig. 11,) engage the mutilated gear and partially rotate the same, this partial rotation of the gear imparting a movement to the extent of one-tenth of a revolution to the numbered disk 32 through the medium of the gear 30 in mesh with the mutilated gear. It will be seen that the mutilated gear is locked against movement at all times except when engaged by the teeth of disk 29, at which time the notch 33 is opposite the mutilated gear, so as to permit its movement. To insure the proper position of the mutilated gear after each operation, I provide a spring-pressed centering-lever 35, having one end coöperating with the mutilated gear, as is well understood. Assuming that the disks 27 and 32 exhibit zero through the sight-opening, the parts will be in the position shown in Fig. 10 and nine fares may be registered and indicated by the disk 27, the movement to accomplish this being in the direction of the arrow in Fig. 10. When the next fare is registered, the disk 29 will engage and operate the mutilated gear, the disk 28 permitting this, and the mutilated gear being in mesh with the gear 30 will operate the disk 32 one-tenth of a revolution, so as to exhibit the numeral "1" before the zero-mark now exhibited through the sight-opening by the disk 27. This operation continues, the disk 32 being moved one-tenth of a revolution for each complete revolution of the disk 27, until "99" is exhibited through the sight-opening in the face-plate.

Referring now to Fig. 3, it will be seen that the disk 32 carries a projection 37 on its inner face, which projection is designed to strike a pivoted lever on the hundreds-indicator and bring said hundreds-indicator into position to exhibit its numeral "1" when the tens and units indicators exhibit zeros through the sight-opening.

38 indicates a pivoted frame bearing on its free end the numeral "1," said frame also carrying a pivoted lever in the form of a bell-crank lever 39, to one member of which is attached a spring 40 for exerting a constant tension against said bell-crank lever and normally holding it in its inner position. The other end of this bell-crank lever carries a projection 41, which is normally in the path of the projection 37 on the tens-disk.

42 indicates a projection on the bell-crank lever which extends inwardly or in an opposite direction from the projection 41, said projection 42 extending down through a reversed-L-shaped slot formed in a frame-plate. When the numeral "9" on the tens-disk is exhibited through the sight-opening, the projection 37 occupies a position above the projection 41, as shown by the dotted lines. The next operation of the tens-disk will cause the hundreds-indicator to be brought down, the projection 41 being engaged until the projection 42 is opposite the lateral enlargement of its guideway, which lateral enlargement receives the projection 42 and permits the bell-crank to swing on its pivot, so that the projection 41 is out of its path and the projection 42 is under the shoulder in its guideway, serving to prevent the hundreds-indicator from returning to its normal position. I do not, however, rely upon the lock thus provided to hold the hundreds-indicator in its lower position, as the next operation of the tens-disk will carry the projection 37 away from the bell-crank lever, permitting said bell-crank lever to swing back to its normal position under the tension of its spring 40. I prefer to arrange a notch 44 in the frame near its pivotal point and provide a spring-pressed lever 45, provided with an outwardly-extending projection at its free end, which is designed to be received in the notch 44 when the frame is in its lower position, and thus serve as a detaining-dog to prevent the elevation of the frame until the machine is set to zero. When the hundreds-indicator is first displayed, the units and tens disks of course exhibit zero through the sight-opening. The next operation will actuate the units-disk, a complete revolution of said disk effecting one-tenth of a revolution with respect to the tens-disk, and so on, as before described, the capacity of the present machine being one hundred and ninety-nine fares. Of course in speaking of the capacity of the machine shown I have reference to the number of fares which may be registered and exhibited through the sight-opening in the face-plate on a single trip and not to the banks of totalizers which register and record the combined totals of all of the trips up to their respective limits, comprehending in the machine shown nine hundred and ninety-nine transfers and nine thousand nine hundred and ninety-nine cash and transfers.

While I have shown a zero-mark which is exhibited through the sight-opening and which is seen whenever the hundred-indicator is in its elevated position, it will be obvious that this mark may be omitted and a blank space left, or a blank extension may be provided on the hundreds-indicator, as is well understood.

It is desirable to indicate through a sight-opening in the face-plate of the machine the kind or class of fares registered, and of course any mechanism to accomplish this must be controlled and actuated by the devices which register and record the different kinds or classes of fares. In Figs. 4 and 6 it will be seen that the inner end of the driving-shaft 4 carries a disk 46, provided with lateral projections in the form of pins 47 and 48. While I have shown and described this element which is mounted upon the main shaft as a disk, it will be obvious that a rock-arm provided with lateral projections would answer the same purpose.

49 indicates a shaft whose axis is (though it is not necessarily so) in alinement with the main shaft. This shaft 49 carries a plate 50 at its front end, (see Figs. 1, 2, and 6,) which plate bears the words "Cash," "Transfers," or similar words indicating the kind or class of fare registered. Referring to Fig. 13, it will be seen that at least one of these words is exhibited through a sight-opening in the face-plate of the machine at all times. The inner end of shaft 49 carries a tappet 51, (best seen in Fig. 4,) which tappet is provided with a radial projection in the paths of movement of the pins 47 and 48, by which said tappet is actuated—that is, thrown from one position to the other—for the purpose of rocking the shaft 49 and exhibiting the words "Cash" or "Transfers" through the sight-opening in the face-plate. This tappet 51 is also provided with a centering-tooth 52, which coöperates with notches in a spring-pressed arm 53. Whenever the operating-lever 5 is pulled to the left, the pin 47 will throw the tappet over until it is centered by its tooth 52, and the word "Transfers" is exhibited through the sight-opening. Successive operation of the operating-lever to the left will not affect the position of these parts above described. However, when the operating-lever is pulled to the right to register cash fares the pin 48 will throw the tappet until its centering-tooth registers with the other notch in the spring-pressed arm 53 and the word "Cash" is exhibited through the sight-opening.

The tappet 51 has a lateral projection 54, to which is secured a muffler 55, designed to coöperate with the bell 56. As shown in Fig. 4, it will be seen that the muffler is resting against the bell, so that when the operating-lever 5 is pulled to the left to register transfers the bell will emit a muffled sound. When the operating-lever is pulled to the right to register cash fares, it will throw the tappet 51 to its other position to indicate "cash" fares and also carry the muffler away from the bell, so that the bell will emit a clear sound. The bell is rung by means of a hammer 57, which is mounted upon a drag-pawl 58, coöperating with the ratchet 11. (See Fig. 19.)

59 indicates a detaining-pawl for the ratchet-wheels 11 and 12, said pawl being held against said ratchets by a spring and having its engaging end slightly beveled or formed inclined, as shown at $x$ in Fig. 19. The purpose of this is to enable said pawl to drop behind the teeth of the ratchets and force said ratchets, or either of them, onward to complete their movement. By doing this it is impossible for an operator to pull the operating-lever slowly in either direction, so as to leave any of the pawls which coöperate with the ratchet-wheels resting on the top of a tooth. The pawl 59 falls behind the teeth, and in so doing, through the medium of its inclined face, forces the ratchet-wheel around in order that the drag-pawl 58 and the operating-pawls 9 and 10 may be seated in their proper positions ready for another operation. This final movement of the ratchets is of course beyond the control of the operator. The pawls 9 and 10, which are the actuating-pawls for the ratchets and which, as before stated, are mounted upon the free ends of the arms 7 and 8, respectively, are so constructed that the pawl 9 may move independently of the pawl 10 or while the pawl 10 remains stationary; but whenever the pawl 10 is actuated the pawl 9 is carried up with it, as before described, and thus the pawl 9 must be moved every time a fare is registered, while in some instances the pawl 10 may remain stationary. In order to compel the operator to give a full stroke to register a fare whenever the operating-lever is moved in one direction or the other, I provide means in the form of an upward extension 60 on the pawl 9, which extension has an inclined groove 61 on its inner face for coöperating with a stud or projection 62, extending from the back plate. A spring 63 is arranged in the path of this extension 60, which tends to throw the same laterally whenever the projection 62 registers with the groove 61, so that on the downward or idle stroke of the pawl the pawl moves in a path different from that which it traveled when it actuated its ratchet 11. This construction resembles a clock-escapement in this regard, and it will be seen that should the operator give either pawl a partial stroke said pawls, being locked to their ratchets on their upward movement, will not permit the ratchets to assume a cocked position, but when the operating-handle is released will restore said ratchets to their former positions. On the other hand, if a stroke is made approximately complete the pawl 59 will drop behind a tooth and lock the ratchets against return movement, the bell will sound, and if the stroke is not completed the extension 60 will be held elevated until a complete stroke is made. The complete stroke or next stroke may start from the starting position of the operating-handle; but said handle will make an idle movement until it takes up the pawl-carrying arms to complete the former stroke and restore the parts to their normal positions. The restoration of the parts to their normal positions after each actuation is thus rendered necessary before another fare can be registered. Spring 64 is arranged to force the pawl 9 into engagement with its ratchet, and by means of a projection 65 the pawl 10 is likewise held in engagement with its ratchet, particularly in its actuating stroke. From the above it will be seen that when the pawl 9 is raised to actuate its ratchet, in which movement the pawl 10 may also be included, the pawl 9 is held against its ratchet by the spring 64, so that the extension 60 rides up alongside of the projection 62, necessitating a full stroke of the operating-lever before the projection 62 will register with the groove 61, at which time the operating-lever will have made a full stroke. When the projection is in this elevated position, the spring 64 will have passed beyond the projection on the pawl 9, with which it formerly coöperated, and the extension 60 will bear against the spring 63, which will exert a lateral pressure thereagainst to force the same to one side, so that the projection 62 will be received in the groove. When the pawl has returned to its normal position, this projection by riding in the groove will force the pawl to one side and away from its ratchet, so that the pawl will not have a dragging action tending to return the ratchet. When the pawl reaches its normal position, it passes beneath the projection 62, and, being thus released, is forced behind or under its ratchet-tooth by the spring 64, which it now engages. It will be obvious that when the pawl 9 is returning, as before described, the projection or pin 65 releases the pawl 10, so that should said pawl 10 be returning with the pawl 9 it will not drag on its ratchet.

65ª indicates a torsion-spring having one end secured in the back plate, while its other end bears upon the free ends of arms 7 and 8. This spring is made sufficiently strong to force the operating-lever and its connected rocking block to a central position after each operation and by bearing against the pawl-carrying arms to also return the pawls 9 and 10 to their normal positions.

66 indicates what is known as the "resetting-shaft," which projects through the casing of the machine and carries a butterfly or winged head on its outer end, upon which appears the word "Set," and an arrow to indicate the direction in which the resetting-shaft is to be turned to restore the parts to their normal positions. In the machine shown it is necessary to make one complete revolution of the resetting-shaft to accomplish the above. This shaft carries a cam 67, which is best seen in Fig. 18, (Sheet 4,) said figure showing the working faces of the cam developed or projected, so as to appear on the same plane.

68 indicates a recess in the lower side face of the cam, in which rests in the normal position of the parts a pin 69, said pin being connected to a sliding plate 70. (See Fig. 4.) This plate is guided so as to move longitudinally the shaft 66 and carries a pawl 71, which engages a ratchet 72 on the end of a shaft carrying one (the stationary) of a pair of paper-feed rolls. This stationary feed-roll is the driver and is marked 73 in the drawings. (See Figs. 2 and 5.) The other side face of the cam is formed with two recesses or seats 74 and 75, the former of which is the home recess and has seated in it when the parts are in normal position a pin 76, which pin projects from a vertically-movable frame 77. This frame is provided with a lug or extension 78 at its upper end engaging the shaft 66, whereby the same may be guided in its movement. (See Figs. 3 and 5.) This frame 77 has mounted in it the numeral-disks 27 and 32 (see Figs. 1, 3, 5, and 6) and their conjoined parts and the hundred-indicator. From an examination of Fig. 18 it will be seen that the first movement of the cam will actuate the pawl-carrying frame 70 so as to effect the feed of the paper strip at the commencement of a resetting operation. While the paper is being fed, the pin 76 is not moved on account of the length of the bottom of the slot 74. However, after the paper has been fed the pin 76 rides up the inclined face of the recess 74 and in so doing raises the frame 77, such elevation of the frame 77 accomplishing the following: The detaining-dog 45 being stationarily mounted and having a limited movement will be forced out of the notch 44 in the hundred-indicator, so that said hundred-indicator, if lowered, will be permitted to to rise. The gears 24 and 30 and the disks 28 and 29 will be thrown out of mesh with their associate parts, thus freeing or releasing the indicating-disks 27 and 32. The sleeves of these indicating-disks carry pinions 79 and 80, respectively, with which spring-pressed sectors 81 mesh at all times. These sectors when the indicating-disks are operated are moved to a position to store up power in their respective springs, and when the continued movement of the indicating-disks causes the sectors, or either of them, to ride over the pinions said sectors are in position to return the indicating-disks to zero the instant the frame 77 is elevated and the disks freed or released. The stops for determining the zero position of the indicating-disks are in the form of spring-pressed pawls 82, there being one pawl for each disk, said pawls coöperating with arms or projections 83, extending from the sleeves upon which the disks are respectively mounted. Pawls 82 are mounted in independently-movable rocking plates 84, pivoted in the back plate, said rocking plates being formed with inverted-L-shaped slots 85, through which slots passes a rod 86, mounted upon the movable frame 77. Springs 87 tend to pull these rocking plates to one side, so that when the frame 77 is elevated either or both of the rocking plates are moved, so that the rod 86 will rest in the lateral enlargement of the slot 85 and upon the shoulder thus provided. These rocking plates 84, or either of them, serve to lock the frame 77 in an elevated position until the spring-pressed sectors 81 return the indicating-disks to a zero position, which, as before stated, is determined by the pawls 82, and when the arms 83, conjoined to the indicating-disks, strike the pawls 82, the rocking plate carrying the pawl so struck is moved laterally, so as to enable the rod 86 to seat itself in the vertical portion of the slot when the frame 77 is restored to its normal position. The purpose in so locking the frame 77 in an elevated position until the indicating-disks are returned to zero is to prevent the operator turning the resetting-shaft a complete revolution before the indicating-disks are home. If no means were provided for insuring the complete return of the indicating-disks, the restoration of the frame 77 to its normal position would cause the gears carried thereby to mesh with their drivers at any point, or the teeth might strike, so as to lock the wheels against movement, necessitating repairs being made to the register. It will of course be obvious that the pawls 82 permit the arms 83 to pass thereunder when the indicating-dials are moved to indicate the number of fares registered on a trip.

Referring now to Fig. 4, 88 indicates a pivoted plate held in its normal position by a suitable spring, said plate carrying two projections 89 and 90, the former of which is in the path of the sliding pawl-carrying plate 70 for the paper-feed, while the latter cooperates with a notch in the lower edge of the movable frame 77 just above the free ends of the pawl-carrying arms 7 and 8. As stated before, the plate 70 is moved to feed the paper before the frame 77 is actuated, this being done upon the initial movement of the resetting-shaft 66. When plate 70 is moved downwardly, the projection 89, being in its path, will be forced to one side, so as to take the projection 90 out of the notch in the frame 77 (thus releasing said frame) and into the paths of the pawl-carrying arms 7 and 8. Irrespective, then, of whether or not the frame 77 is elevated and the indicating-disks returned to zero, the initial movement of the resetting-shaft will lock the pawl-carrying arms 7 and 8 against movement and prevent the machine being operated. Of course upon the completion of a revolution of the resetting-shaft the frame 77, having been elevated, is first restored to its normal position, after which the plate 70, which is held depressed throughout the entire resetting operation, is finally restored, permitting the locking-plate 88 to move laterally to bring the projection 89 under the plate 70 and the projection 90 out of the path of the pawl-carrying arms 7 and 8 and into its notch in the frame 77.

91 indicates a pinion secured to the shaft 66, with which pinion cooperates a detaining-pawl 92, (see Figs. 1 and 2,) whereby when the operator starts to turn the resetting-shaft said detaining-pawl will prevent the shaft being rotated reversely or in the wrong direction. This necessitates the operator completing the operation of resetting the register to zero when said operation has once been commenced.

93 indicates a gear in mesh with pinion 91, said gear 93 carrying a crank-pin 94, which operates in a slot in a sliding frame 95, said sliding frame being guided in its vertical movement in any suitable manner and carrying a trip-indicator plate 96, containing suitable words, such as "In" or "Out," one of which is designed to be exposed through the sight-opening in the face-plate for well-known purposes. By having the gear 93 of such diameter relative to its driving-pinion that a complete revolution of the latter will rotate the gear 93 one-half a revolution I am enabled to move the plate 96 to its extreme limits and expose the words at the top or bottom thereof whenever the resetting-shaft is seated home, any position of the resetting-shaft short of the home position only partially exposing either of the words "In" or "Out," &c.

I have referred to the adding mechanism as a "totalizer," the same being divided into two banks, in one of which banks are registered transfers, while in the other of said banks are registered cash and transfers, the latter bank being actuated at every operation of the register, while the former is only actuated when a transfer is registered. It is desirable to convert this adding mechanism or these totalizers into a recording mechanism, whereby the fares are not only registered, but a record made of fares so registered, which record indicates the number of fares registered on a trip, the record being produced whenever the machine is reset or the indicating-disks are returned to zero. To carry out this idea, the wheels of the adding mechanisms have their peripheries spaced, preferably, into ten divisions, in each of which is a type character representing the numerals from "1" to "9" and a zero.

97 indicates a plate pivoted at 98, (see Fig. 2,) said plate being of such width as to form an efficient guide for the strips of paper to be printed upon or impressed, the free end of said plate being opposite the type on the adding-wheels, between which parts the strips of paper are designed to pass and receive an impression. This plate 97 serves as a platen or backing for the paper, the type-hammer or impression-maker being located behind or under the free end of the plate 97 and being in the form of a rocker 99, having a flat or cam face next the platen, as shown in Figs. 2 and 6. From the inner end of this rocker extends a projection 100, located above a pin or projection 101 on the frame 77, whereby when said frame is elevated the impression-maker 99 is rocked, so as to force the platen and the paper against the type in the printing-line on the adding-wheels. The company's strip is preferably drawn from a roll 102, mounted in suitable bearings secured to a section 103, (see Fig. 15,) which is hinged to the casing, and whose lower end is provided with a hasp-opening, through which passes a staple 104 on the casing, so that this hinged section and another to be referred to may be locked by the company to prevent access to the company's strip by another than an authorized person who possesses the key to the lock. The company's strip is guided from the roll 102 by suitable guides 105 to between the printing-wheels and the platen, whence it passes through an opening 106 in the casing 2. This opening is preferably formed with a large mouth, making it easy to introduce the paper through the opening from the inside, the paper after being introduced through the opening being directed upwardly outside of the casing 2, as shown by the dot-and-dash line in Fig. 15.

107 indicates a section which is hinged to the casing 2 at its upper end, its lower end being provided with a hasp-opening to coöperate with the staple 104. In practice section 103 is designed to be placed in position over the staple and then the section 107 arranged in position, after which the lock is passed through the staple, locking both sections against movement and housing the protruding end of the company's strip between the casing 2 and the section 107. Suitable space is left to permit the end of the company-strip to operate freely and not buckle.

108 indicates a section which is preferably hinged to the section 107, though this is not necessary, as it may be hinged to the casing 2. A keeper is provided for the section 108, whereby the same may be held in its closed position, said keeper permitting the section to be opened at will by the conductor. An opening 109 is arranged in the section 107, through which may be introduced what is known as the "conductor's strip," this strip when so introduced resting upon plate 97, as shown in Fig. 2. I have marked the company-strip as $a$ and the conductor-strip as $b$. The company-strip is preferably thin paper, while the conductor-strip is preferably cardboard, two or three ply, and when an impression is made the company-strip, being next the type, will not only receive and take the impression, but by being thin will permit the type to leave their impression on the conductor-strip. In introducing the conductor-strip the feed-roller 73, before referred to, bears against the company-strip, and this roller is depended upon to feed both strips of paper before an impression is made thereon. Opposite the driving-roller 73 is an idle feed-roller 110, (see Figs. 2 and 5,) which is mounted in a pivoted spring-pressed frame 111, from which extends a handle 112, said handle projecting through the casing 2, where it is designed to be grasped by the conductor and the paper-feed rolls separated to permit easy introduction of the conductor-strip to its primary position.

113 indicates a flanged roller, (see Figs. 2 and 7,) which roller is arranged above the plate 97 and into the reduced portion of which extends a roller 114, said latter roller being mounted in one member of a bell-crank lever 115, whose other member carries a projection 116, designed to coöperate with a notch 117 in the disk 46. In the absence of a conductor's strip roller 114 fits in the reduced portion of the flanged roller 113, and the projection 116 is in the notch of the disk 46, so that the operating-lever cannot be manipulated. A suitable spring is provided to hold the parts in this position. When the conductor's strip is introduced along the plate 97, it separates the rollers 113 and 114, so as to carry the projection 116 out of the notch in the disk 46, thus unlocking said disk and permitting the operation of the machine.

In operation the company's strip is arranged in position and the hinged sections or panels 103 and 107 locked in place. The conductor entering the car inserts his strip, herein described as the "conductor's strip," spreading the rollers 113 and 114, so that fares may be registered. At the end of a trip the resetting-shaft is operated, the first thing accomplished being the feeding of the two strips of paper outwardly and the manipulation of the locking-plate 88 to release the frame 77 and lock the pawl-carrying arms 7 and 8 to prevent the registration of fares in the machine when the resetting-shaft has commenced its movement and before said movement is completed. The frame 77 is now lifted, the pin 101 causing the rocker to press the paper against the adding-wheels and make an impression. The sectors return the indicating-disks to their normal positions, frame 77 being locked in its elevated position by the plates 84 until such restoration of the indicating-disks. When the resetting-shaft is moved, say, about one-fourth of a revolution or to such position before it reaches one-half a revolution, the conductor may remove his strip upon which the impression has been made and another conductor, known as the "relief man," may insert his strip and the resetting-shaft turned to complete its revolution. The new strip being introduced will receive an impression when the pin 76 drops into the recess 75 of the cam on the resetting-shaft, after which the frame 77 is again elevated until the pins 69 and 76 are opposite their respective recesses 68 and 74, when they drop thereinto and the parts are in their home position. To illustrate the printing on the two strips, we will suppose that the following appears on a conductor's strip which has just been removed:

```
112—0610
109—0604
107—0599
102—0589
097—0579
```

The lowest figures in the above indicate the condition of the register at the time the strip was inserted, and the upper figures indicate the condition of the register at the time the strip was removed. We will now assume the following to be the record of the next strip inserted:

```
127—640
124—634
120—626
115—616
112—610
```

In this it will be seen that the lowest figures correspond with the last figures printed on the strip previously removed, as set forth in the above example. Referring back to the first example, being the record of the first strip removed, we find that the condition of register before such strip was inserted showed that ninety-seven transfers had been registered and that five hundred and seventy-nine cash fares and transfers were registered before said strip was inserted. At the end of the first trip when the register was turned to zero the record shows that a total of one hundred and two transfers is exhibited in the machine, which means that five transfers have been added in the totalizer, plus the ninety-seven transfers already registered, making one hundred and two transfers registered altogether. The strip also shows five hundred and eighty-nine cash fares and transfers or tickets as a total, which is ten more than were in the machine at the beginning of the trip. As five transfers have been registered on a trip and ten fares both cash and transfers have been registered, it follows that five cash fares were registered, as well as five transfers. In other words, by subtracting the number of transfers from the total number of fares registered the number of cash fares is readily ascertained.

I am aware that minor changes in the arrangement, construction, and combination of the several parts of my device can be made and substituted for those herein shown and described without in the least departing from the nature and principle of my invention.

Having thus described my invention, what I claim, and desire to secure by Letters Patent, is—

1. The combination with totalizers for registering different classes of fares, of an independent ratchet for each totalizer, a pawl for each ratchet, and a rockable element, which, upon being moved in one direction will operate one totalizer only, and, upon being moved in the other direction, will operate all of said totalizers; substantially as described.

2. The combination with totalizers, of independently-movable ratchets therefor, a pawl for each ratchet, a rocking element which, when moved in one direction, will operate one pawl independently, and when said rocking element moves in the opposite direction, it will operate both pawls, and means in the path of said independently-movable pawl for disengaging the same from its respective ratchet on its return stroke; substantially as described.

3. The combination with two totalizers, of two ratchets arranged side by side for operating the same, an independently-movable pawl for operating one of said ratchets and its controlled totalizer, a pawl controlled by said first-mentioned pawl for operating the other ratchet and totalizer coincidently with the first-mentioned totalizer under certain conditions, means which, when moved in one direction, operates said independent pawl, and, when moved in the other direction, operates both of said pawls, and means for coöperating with the independent pawl for carrying the same out of engagement with its ratchet upon the return movement of said pawl; substantially as described.

4. The combination with totalizers, of ratchets therefor, pawls for said ratchets, one of which pawls is independently movable, an extension on said independently-movable pawl provided with a groove, a projection for coöperating with said grooved extension, and springs coacting with said extension at different times when the pawl is in different positions; substantially as described.

5. The combination with totalizers, of ratchets therefor, pawls for said ratchets, one of which pawls is independently movable, a pin or projection on said independently-movable pawl for holding the other pawl in operative position, pawl-carrying arms, and a rocking block for coöperating with said arms, said rocking block being cut away or recessed on one side to permit one of said arms to remain stationary when said block is moved in a certain direction; substantially as described.

6. The combination with an operating-lever, of a rock-shaft upon which said lever is mounted, a rocking block secured to said shaft, said block being recessed or cut away at one side, pawl-carrying arms resting upon said block, whereby, when said block is rocked in one direction all of the pawl-carrying arms are operated, and when said block is rocked in another direction, but one of said pawl-carrying arms is operated, pawls arranged upon the free ends of said arms, ratchet-wheels in engagement with said pawls, and totalizers which are actuated from said ratchet-wheels; substantially as described.

7. The combination with a totalizer, of a units-indicator which is operated coincidently with said totalizer, a tens-indicator, and means for imparting motion from said units-indicator to said tens-indicator, said means comprising a notched disk 28, a toothed disk 29, a mutilated gear with which said disks coöperate, and a spur-wheel in mesh with said mutilated gear and connected to said tens-indicator; substantially as described.

8. In a fare-register, the combination with the operating-lever capable of being moved in opposite directions to register different classes of fares, of a rock-shaft on which said lever is fixed, a rocking element 46 arranged upon the inner end of said rock-shaft, pins or projections 47 and 48 carried by said rocking element, an independently-movable shaft, a plate carried by said shaft containing words indicating the kind of fare registered, and a tappet mounted upon said independently-movable shaft, and so arranged as to be struck by the pins 47 and 48 to rock its shaft and carried plate and indicate the kind of fare registered when the operating-handle is actuated in certain directions; substantially as described.

9. In a fare-register, the combination with a rock-shaft, of a lever fixed thereon, and being capable of movement in different directions to register different classes of fares, a plate 46 mounted upon the inner end of said rock-shaft, pins 47 and 48 carried by said plate, a tappet 49 arranged between said pins and designed to be struck thereby whenever the direction of movement of the operating-lever is changed to register a different class of fares, a plate connected to said tappet and containing words indicating the kind of fare registered, and a centering device coöperating with said tappet for determining the position of said plate; substantially as described.

10. In a fare-register, the combination with a rock-shaft, of an operating-lever mounted thereon and being capable of movement in different directions for registering different classes of fares, an audible signal which is sounded upon the registration of every fare, a muffler for said signal, and means on the rock-shaft for throwing said muffler into an operative position upon the registration of a certain class of fares; substantially as described.

11. In a fare-register, the combination with an operating-lever capable of movement in different directions for the registration of different classes of fares, a bell which is sounded upon the registration of every fare, a muffler for said bell, and means operated by the operating-lever for throwing said muffler into engagement with the bell when one kind of fare is registered, said means throwing said muffler out of engagement with the bell when another kind of fare is registered; substantially as described.

12. In a fare-register, the combination with an operating-lever capable of movement in different directions for registering different classes of fares, of a plate containing words to indicate the kind or class of fare registered, means operated by said lever and connected to said plate for moving the plate in different positions depending upon the direction of movement of the operating-lever, an audible signal, and a muffler connected to said indicating-plate and coöperating with said audible signal; substantially as described.

13. In a fare-register, the combination with an operating-lever capable of movement in different directions for registering different classes of fares, a rock-shaft upon which said lever is fixed, a rocking element arranged upon the inner end of said shaft, projections carried by said rocking element, a tappet arranged between said projections and operated thereby when the operating-lever is moved in different directions, an indicator connected to said tappet, said indicator containing words designating the kind or class of fare registered, a bell which is sounded upon the registration of every fare, and a muffler connected to said tappet, and designed to contact with said bell when the tappet is in certain of its positions; substantially as described.

14. The combination with a resetting-shaft, of a gear-wheel driven thereby, a wrist-pin carried by said gear, a sliding plate or crosshead operated by said wrist-pin, and a trip-indicator connecting to said sliding plate; substantially as described.

15. The combination with a resetting-shaft, of a cam carried thereby, a plate which is vibrated by said cam, a pawl carried by said plate, a ratchet with which said pawl engages, and a paper-feed roll which is driven by said ratchet; substantially as described.

16. The combination with a resetting-shaft, of a cam arranged thereon, a plate which is vibrated by said cam, a locking-plate 88 which is operated upon the movement of said first-mentioned plate, and a movable frame carrying the indicating-disks, which is released upon the actuation of said locking-plate; substantially as described.

17. The combination with a resetting-shaft, of a cam arranged thereon, a movable plate 77 which is operated from said cam, a lock for said movable plate, and means operated by said cam for actuating said lock to release said movable plate before the same is moved; substantially as described.

18. The combination with pawl-carrying arms for the totalizers, of a movable frame carrying indicating-disks, a resetting-shaft, a cam on said shaft for moving said frame, and a locking-plate which is operated by said cam, said locking-plate in one position locking the pawl-carrying arms against movement, and in another position, locking the movable frame against movement; substantially as described.

19. The combination with a resetting-shaft, of a cam carried thereby, a plate which is vibrated by said cam, a locking-plate 88, a movable frame 77 which is locked in position by said locking-plate, a projection on locking-plate 88 in the path of the vibrating plate, whereby, when said resetting-shaft is operated, said plate is vibrated and the locking-plate is laterally displaced to relieve the movable frame; substantially as described.

20. The combination with a resetting-shaft, of a cam carried thereby, a paper-feed mechanism which is operated by said cam, a movable frame and indicating-disks carried by said frame, which movable frame is operated by said cam after the paper-feed mechanism has been operated and is stationary; substantially as described.

21. The combination with a resetting-shaft, of a cam mounted thereon, a movable frame 77 which is operated from said cam, indicating-disks arranged on said movable frame, and means for returning said disks to a zero position when said movable frame is elevated; substantially as described.

22. The combination with a frame 77 and its means of operation, of indicating-disks carried by said frame, registering mechanism which is normally in mesh with said disks, and means for returning the disks to a zero position when the frame is elevated and the disks are thrown out of mesh with the registering mechanism; substantially as described.

23. The combination with a frame 77 and its means of operation, of indicating-disks carried by said frame, registering mechanism which is normally in mesh with said disks, means for returning the disks to a zero position when the frame is elevated and the disks are thrown out of mesh with the registering mechanism, and means for holding said frame in an elevated position until the disks are restored to a zero position; substantially as described.

24. The combination with a movable frame 77 and its means of operation, units and tens disks carried thereby, registering mechanism for driving the units-disk, means operated by the units-disk for driving the tens-disk, mechanism for restoring said disks to a position of zero when out of mesh with the registering mechanism, and independently-movable locking-plates for engaging and holding said movable frame in an elevated position until the units and tens disks are restored to zero; substantially as described.

25. The combination with a movable frame, of means for operating the same, units and tens disks mounted in said frame, means for operating said disks, arms carried by said disks, pivoted plates carrying stop-pawls in the paths of said arms, said pivoted plates being formed with inverted-L-shaped slots, and a cross-bar on the movable frame passing through said slots; substantially as described.

26. The combination with a movable frame, of indicating-disks carried thereby, arms conjoined to said disks, pivoted plates formed with inverted-L-shaped slots, spring-pressed pawls carried by said plates in the paths of said arms, and a rod arranged upon said movable frame and extending through said slots, whereby, when said frame is elevated, the plates move laterally to engage the rod and lock the frame in its elevated position until the arms contact with the stop-pawls, at which time the indicating-disks are returned to zero and the plates are restored to their normal positions wherein the movable frame is released and is permitted to return home; substantially as described.

27. The combination with a tens-indicator, of a hundreds-indicator operated thereby, means for holding said hundreds-indicator in proper position after actuation by the tens-indicator, a movable frame in which said indicators are mounted, and means for moving said frame to release said indicators and permit their return to zero; substantially as described.

28. The combination with the tens-indicator, of a projection carried thereby, a hundreds-indicator, a bell-crank lever pivoted to said hundreds-indicator and provided with projections, one of which coöperates with the projection on the tens-indicator, and the other of which coöperates with a reversed-L-shaped slot, a stationarily-mounted detaining-pawl 45 for holding said hundreds-indicator in the position in which it is placed by the tens-indicator, a movable frame carrying said indicators, and means for moving said frame; substantially as described.

29. In a fare-register, the combination with the stationarily-mounted printing-wheels and indicating-disks, of a pivoted plate forming a guide for the paper to be printed upon, a rocking frame for forcing said plate and the paper against the printing-wheel, and means for rocking said frame, said means comprising a movable frame upon which are carried the indicating-disks; substantially as described.

30. The combination with printing-wheels for making an impression upon two strips of paper, one of said strips being retained within the machine and the other of said strips being removable, an operating-shaft for the machine, and means for locking said shaft against movement in the absence of the removable strip; substantially as described.

31. The combination with printing-wheels, for impressing strips of paper, one of said strips of paper being retained within the machine and the other of said strips being removable, a lever carrying a roller in the path of said removable strip, and a lock operated by said lever, said lock being open to permit the machine to be operated upon the introduction of the removable strip; substantially as described.

32. The combination with printing-wheels designed to make an impression upon a removable strip of paper, a flanged roller 113, a roller 114 mounted upon a lever and operating in the reduced portion of said flanged roller, means in the form of a strip of paper for spreading said rollers, an operating-shaft, and a lock for said shaft, said lock being controlled by the lever carrying the roller 114; substantially as described.

33. In a fare-register for recording the condition of its totalizer upon strips of paper, the combination with a casing, of a hinged section or panel for housing the company-strip, and a hinged section or panel arranged exteriorly the first-mentioned section or panel, for housing the conductor-strip; substantially as described.

34. The combination with a casing of a fare-register, of a hinged section or panel 103 carrying a roll of paper, a hinged section or panel 107 for housing the paper from said roll after said paper has passed through the machine, and a hinged section or panel 108 arranged exteriorly the section 107, for housing a removable strip of paper; substantially as described.

In testimony whereof I hereunto affix my signature, in the presence of two witnesses, this 23d day of June, 1900.

WILLIAM G. KIRCHHOFF.

Witnesses:
WM. H. SCOTT,
F. R. CORNWALL.